US012695005B2

(12) United States Patent
Kummer

(10) Patent No.: US 12,695,005 B2
(45) Date of Patent: Jul. 28, 2026

(54) FIRE-RESISTANT CABLE SPLICE

(71) Applicant: Southwire Company, LLC, Carrollton, GA (US)

(72) Inventor: Randy D. Kummer, Villa Rica, GA (US)

(73) Assignee: Southwire Company, LLC, Carrollton, GA (US)

(*) Notice: Subject to any disclaimer, the term of this patent is extended or adjusted under 35 U.S.C. 154(b) by 189 days.

(21) Appl. No.: 18/296,450

(22) Filed: Apr. 6, 2023

(65) Prior Publication Data

US 2024/0242856 A1 Jul. 18, 2024

Related U.S. Application Data

(60) Provisional application No. 63/328,026, filed on Apr. 6, 2022.

(51) Int. Cl.
*H01B 7/29* (2006.01)
*H01B 7/295* (2006.01)
*H01B 7/40* (2006.01)

(52) U.S. Cl.
CPC ............... *H01B 7/295* (2013.01); *H01B 7/40* (2013.01)

(58) Field of Classification Search
CPC ... H01R 4/22; H01R 4/70; H01R 4/72; H01R 4/726; H01R 4/00; H02G 15/02; H02G 15/04; H02G 15/00; H02G 15/06; H01B 7/02; H01B 7/04; H01B 7/06; H01B 7/29; H01B 9/02; H01B 9/021
USPC .......... 174/74 R, 74 A, 77 R, 75 F, 83, 84 R, 174/88 R
See application file for complete search history.

(56) References Cited

U.S. PATENT DOCUMENTS

| | | | | |
|---|---|---|---|---|
| 3,823,255 A * | 7/1974 | La Gase | H01B 7/295 | 174/121 SR |
| 4,018,962 A * | 4/1977 | Pedlow | H02G 15/10 | 428/921 |
| 4,018,983 A * | 4/1977 | Pedlow | C08K 13/04 | 174/91 |
| 4,428,999 A * | 1/1984 | George | D04H 11/00 | 428/920 |
| 4,822,953 A * | 4/1989 | John | H01B 7/29 | 174/84 R |
| 5,091,608 A * | 2/1992 | Gunther | H02G 15/003 | 428/377 |
| 6,351,592 B1 * | 2/2002 | Ehn | G02B 6/4471 | 174/541 |

(Continued)

FOREIGN PATENT DOCUMENTS

| | | |
|---|---|---|
| EP | 0424090 B1 | 9/1994 |
| EP | 0708455 B1 | 2/1998 |
| WO | 9849693 A1 | 11/1998 |

*Primary Examiner* — William H. Mayo, III
(74) *Attorney, Agent, or Firm* — Merchant & Gould P.C.

(57) ABSTRACT

Fire resistant splices, kits, and methods for splicing fire resistant cables disclosed herein can maintain an operable connection and meet applicable fire codes to allow a 2 hour egress under extreme heat conditions. Splices disclosed herein can comprise an outer steel enclosure and an interior cable spliced within. Splices disclosed herein may comprise a layer of quartz material disposed immediately against a metal connector forming the electrical connection between conductors of each wire, and wrapped in a ceramifiable silicon rubber layer.

20 Claims, 2 Drawing Sheets

(56) References Cited

U.S. PATENT DOCUMENTS

| | | | | |
|---|---|---|---|---|
| 6,387,518 | B1 * | 5/2002 | Wolfer | C08L 83/04 428/920 |
| 7,339,115 | B2 | 3/2008 | Konnik | |
| 8,476,541 | B1 * | 7/2013 | Kiely | H02G 3/081 174/665 |
| 9,306,340 | B2 * | 4/2016 | Chen | H01R 13/6581 |
| 10,998,651 | B2 * | 5/2021 | Moshggoo | H05B 3/06 |
| 2002/0160209 | A1 * | 10/2002 | Cottevieille | H01B 3/46 524/588 |
| 2007/0012470 | A1 * | 1/2007 | Konnik | H02G 15/08 174/88 R |
| 2018/0241190 | A1 * | 8/2018 | Gyppaz | H02G 3/0412 |

* cited by examiner

FIRE-RESISTANT CABLE SPLICE

REFERENCE TO RELATED APPLICATION

This application claims the benefit of U.S. Provisional Application No. 63/328,026, filed Apr. 6, 2022, which is incorporated herein by reference in its entirety.

BACKGROUND

Fire resistant cables are an essential part of fire safe electrical systems (e.g., life safety electrical systems) that preserve electrical systems at high temperatures to allow for extended egress times. For instance, extended egress can be necessary to allow sufficient time to exit high occupancy residential and commercial buildings where there may be large number of people in a building, hospitals and schools where the egress may be difficult. Preserving electrical systems during fire events also is necessary to ensure safe conditions for firefighting efforts and to ensure that support systems such as fire alarms remain operational.

During installation of electrical systems, it is common that cable runs can be spliced together to make use of shorter lengths of cable that may otherwise be discarded. Cable splices also can be applied to repair damaged cables without replacing (and repulling) the entire cable or set of cables within a conduit. However, splicing cables in this manner can interrupt the fire-resistant jacketing and in turn render the cable vulnerable to fire, and outside of specifications.

Thus, fire-resistant cable splices that can ensure that a fire resistance provided by specially engineered cables is preserved when splicing becomes necessary during installation or repair are needed.

SUMMARY

UL 2196-certified fire-resistant cable splices are disclosed herein and can comprise a first cable comprising a first metal conductor, a second cable comprising a second metal conductor, a connector forming an electrical connection between the first and second metal conductors, a quartz fabric in contact with and surrounding the connector, and a tape layer in contact with and surrounding the first tape layer. The tape layer can comprise a ceramifiable silicon rubber. In certain aspects, the fire-resistant cable splice remains operational at temperatures of 1850° F. for at least two hours.

Fire resistant cable splice kits are also disclosed herein and can comprise (or consist essentially of, or consist of) a connector configured to secure a first metal conductor to a second metal conductor, a quartz fabric, a tape comprising a ceramifiable silicon rubber, and an enclosure.

Methods for forming a UL 2196-rated fire-resistant connection between two fire resistant cables are also contemplated herein, and can comprise (or consist essentially of, or consist of) inserting a first conductor and a second conductor into an enclosure, forming an electrical connection between the first and second conductors, surrounding the electrical connection with a quartz fabric, and applying a tape comprising a ceramifiable silicon rubber to the quartz fabric wherein the tape surrounds the electrical connection, and closing the enclosure.

DETAILED DESCRIPTION

Figure 1:
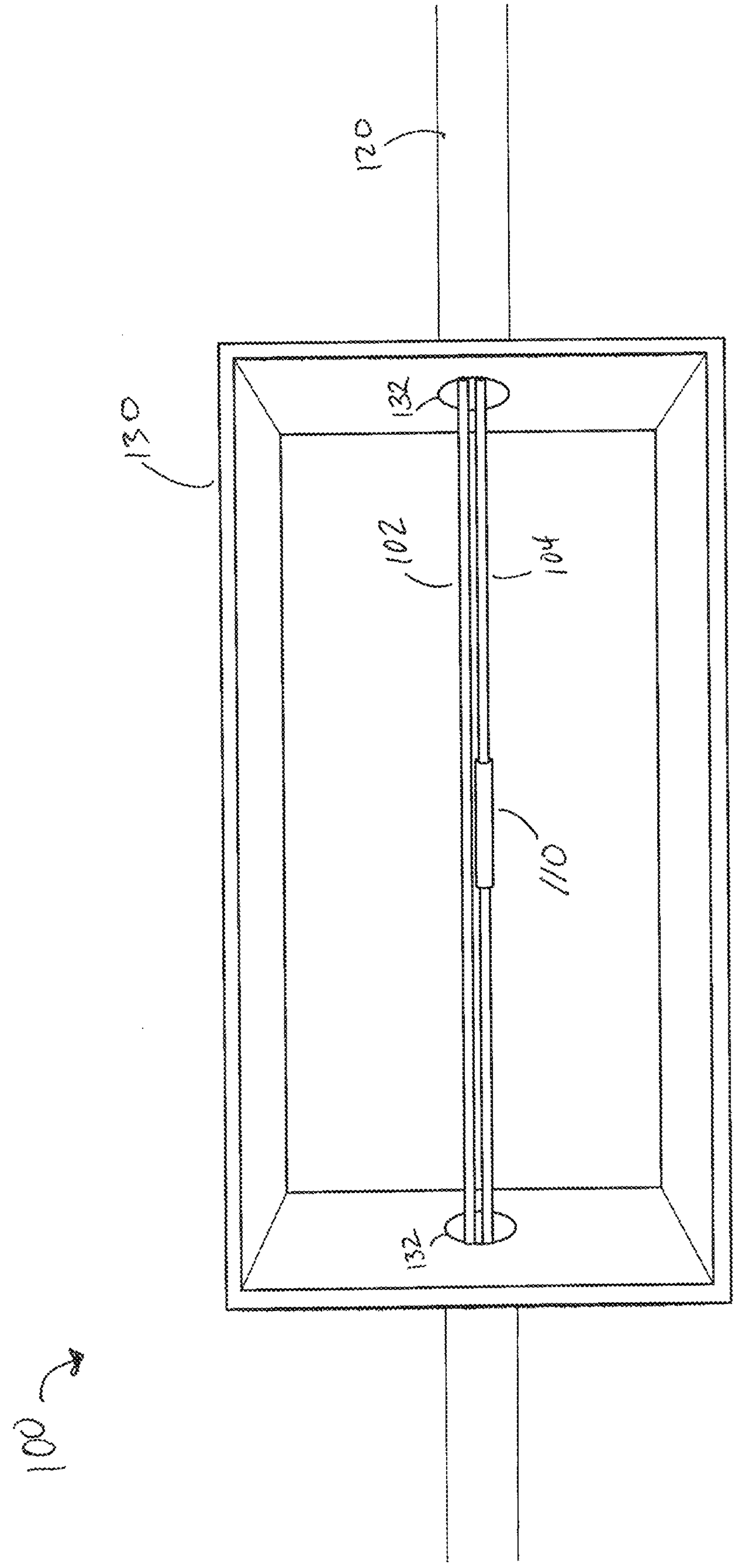
FIG. 1 is a diagram of an embodiment of a splice as disclosed herein.

Fire-resistant cable splices, kits, and methods for splicing cables are disclosed herein as improvements over conventional fire-resistant splices. Conventional fire-resistant splices have employed ceramifiable silicone rubber as an intermediate layer, but typically crack when ceramified during heating resulting in a failed mechanical and operational state of the spliced cable. Splices disclosed within U.S. Pat. No. 7,339,115 have addressed this cracking issue by requiring an external retaining jacket layer to deflect heat from the ceramifiable silicon rubber layer and apply pressure to reduce the mechanical and electrical failure observed where the silicon rubber is provided as the outer layer.

Surprisingly, it was found that employing a quartz layer on the interior can provide a fire-resistant splice that does not experience the cracking observed after heating of conventional splice kits that require an outer retaining jacket. Particularly, it was found that applying a heat-resistant layer inside of the ceramifiable silicone rubber layer can eliminate the cracking typically observed in the external layer after exposure to intense heat and flame. Without being bound by theory, it is believed that the cracking of the ceramified layer may be avoided through absorbing heat and expansion of the conductor with an intermediate layer between the ceramifiable rubber and the spliced electrical connection. For instance, splices formed with a quartz fabric between the electrical connection and an outer insulating layer comprising ceramifiable silicon rubber were found to prevent cracking of the ceramified rubber after heating.

The quartz fabric layer generally can be any suitable to surround the electrical connection between the first and second conductors and provide protection to splice between the connection and the ceramifiable silicone rubber layer. In certain aspects, the quartz fabric can be a quartz wool, a quartz yarn, a quartz roving, a chopped quartz, a quartz veil, or a quartz felt. The quartz fabric can be entirely quartz or formed from a blended fabric comprising quartz (e.g., a fabric comprising at least 25% quartz, at least 50% quartz, at least 75% quartz, or at least 90% quartz).

As referred herein quartz fabrics will be understood to have conventional compositions and structure. For instance, quartz wool can comprise $SiO_2$ fibers having micron size diameter. In certain aspects the quartz wool can comprise at least 99% silicon dioxide as fibers having an average diameter of less than 10 microns. Alternate compositions are also contemplated herein. The quartz layer also may be characterized by the amount of quartz present surrounding the connection. In certain aspects, the layer of quartz fabric can be from 1 to 100 g, from 10 to 50 g, or from 20 to 30 g. Quartz fabric layer also may be any thickness that is suitable to provide the necessary protection. In certain aspects, a thickness of the quartz fabric layer can be in a range from 0.1 mm to 30 mm, from 0.1 mm to 10 mm, from 0.1 to 2 mm, or from 1 mm to 5 mm. The density of the quartz fabric may also be any that is suitable, such as from 1 to 50 g/cm$^3$, from 2 to 25 g/cm$^3$, or from 10 to 20 g/cm$^3$.

The insulation layer comprising a ceramifiable silicon rubber generally can comprise any amount of the silicon rubber appropriate to form a hardened ceramic shell upon heating or exposure to fire. The composition of the ceramifiable silicon rubber can be as provided within Elastosil® R 512/70 which is noted as a ceramifiable, peroxide crosslinking silicone rubber. Other ceramifiable silicon rubbers are also contemplated herein. In certain aspects, the ceramifiable silicon rubber can be applied as a tape to form the splice, such as have been made available by 3M previously and known to those of skill in the art. Alternatively, a polymeric sleeve comprising the ceramifiable silicon rubber may be employed to form the splice.

As for the quartz fabric described above, the tape layer can comprise any amount of ceramifiable silicon rubber as needed to form a hardened layer and provide protection from extreme heat and flame, under applicable codes UL2196 or USC-139.

Fire resistant cable splices disclosed herein therefore generally can comprise (or consist of or consist essentially of) an electrical connection formed between a first electrical conductor and a second electrical conductor, a quartz fabric surrounding the electrical connection, and an insulation layer comprising a ceramifiable silicon rubber. In certain aspects, the quartz fabric can partially or completely surround the electrical connection. In certain aspects, the quartz fabric can be adjacent to and in contact with the electrical connection. Similarly, the quartz fabric can be adjacent to the outer insulating layer comprising a ceramifiable silicon rubber. Alternatively, additional layers may be provided within the splice as appropriate. For instance, additional insulating layers may be provided adjacent the electrical connection to provide additional protection. In other aspects, shielding layers may be provided in contact with the electrical connection or external to the quartz fabric to improve performance of the cable.

While cable splices disclosed herein do not require an external jacket layer surrounding the quartz fabric to prevent cracking and mechanical failure from exposure to fire and extreme temperatures, additional layers may be included exterior to the splice ceramifiable silicon rubber layer without causing adverse effect to the performance or fire resistance of the splice. Thus, the cable splice may additionally comprise external insulating or jacketing layers, such as the metallic layer of an armored cable, or a further enclosure not in immediate contact with the cable.

Fire-resistant splices disclosed herein can be applied to any type of fire-resistant cable with respect to size, number of conductors, or application. For instance, fire-resistant cable splices and systems can refer to life safety electrical systems and components thereof, as defined throughout the 2020 NEC code such as NEC § 517 directed to wiring within health care facilities and the like. In certain aspects, fire-resistant splices can be applied to protect 120V systems, 240V systems, 300V systems, 480 V systems, or 600V systems. In other aspects, splices disclosed herein can be applied to a splice of a first and second conductor selected from a bell wire, a data cable, a coaxial cable, a thermostat wire, a security cable, or combinations thereof. Fire protective systems can comprise fire alarm system (FAS) cables, CMR communication riser cables (CMR), and power limited fire alarm riser and plenum cables (FPLR, FPLP). First and second conductors can comprise a low voltage cable including a THHN cable, a THWN cable, a THWN-2 cable, a XHHW cable, a XHHW-2 cable, or combinations thereof. Splices contemplated herein can comprise a plurality of conductors connected together, e.g., two, or more than two conductors. First and second conductors are not limited by size, and in certain aspects can be 2 to 18-gauge wires, or 14 to 18 gauge wire, 10 gauge wire, 12 gauge wire, 14 gauge wire, 16 gauge wire, or 18 gauge wire. In certain aspects, first and second conductors can be a solid or stranded metal selected from copper, gold, silver, brass, steel, and combinations thereof.

Splices disclosed herein generally can be deployed over a wire-to-wire metal connector securing first and second conductors within an electrical connection. In certain aspects, the connector can be configured to accept at least two of any size conductor disclosed above. In certain aspects the connector can be a metal crimp connector (e.g., brass, copper, steel, silver, gold).

Once the splice is assembled about the connection the splice may also be enclosed, for instance within an electrical junction box to complete installation of the fire alarm system cable. Enclosures may be provided separately or considered as part of the splice, for instance within a splice kit. Enclosures contemplated herein can be any that comply with appropriate standards as would be understood by those of skill in the art. In certain aspects, the enclosure can comprise carbon steel, stainless steel, aluminum, or fiberglass materials. In other aspects, the enclosure can be a NEMA-1 rated enclosure comprising or consisting of fiberglass. Enclosures may also comprise conduit fittings to allow interaction with a section of conduit providing the first and second conductors into the enclosure while maintaining fire protection. Appropriate fittings generally can be any that are configured to receive and secure conduit and/or metallic jacketing of fire rated cables to the enclosure.

Splice kits are also contemplated herein for the purpose of providing a set of materials for the installation of a splice within a fire-resistant cable in accordance with UL-2196 or USC-139. For instance, the splice kits disclosed herein can comprise one or more connectors (e.g., crimp connectors or butt connectors) sized to receive any particular size and number of first and second conductors disclosed above. In certain aspects, a connector can be supplied for each of a pair of 14 gauge conductors, a pair of 16 gauge conductors, and a pair of 18 gauge conductors to be applied as needed within a given fire-resistant electrical system in need of repair. Kits disclosed herein also can comprise an amount of quartz fabric to apply over the electrical connection as described herein. Certain aspects may comprise a pre-cut quartz fabric, or alternatively comprise a fabric cutter within the kit, or as part of the kit structure (e.g., within a wall of a packaging enclosing the in splice kit materials). The quartz fabric can be pre-cut to several appropriate sizes or provided as a roll to be fitted to the cable as needed. For instance, a width of the quartz fabric roll may correspond to a diameter of the splice such that the length of the splice may be determined according to the electrical connection made.

Surprisingly, cable splices as described herein were found to exhibit exceptional performance under extreme temperatures, as required by UL 2196 and USC 139 guidelines. In certain aspects, cable splices disclosed herein may remain operational at temperatures of 1850° F. for at least 30 minutes, at least 60 minutes, at least 90 minutes, or at least two hours. As referred to herein, operational may be quantified by an amount of current that leakage current flowing from the conductor to ground. Under normal operation, leakage current would be absent or minimal, such as observed in the initial stages of examples shown below. Generally, for the purposes of a fire-resistant splice, the conductor can be considered operational following exposure to extreme temperature where the leakage current remains below 2 A on an applied voltage of 72V, as for each of the Examples below. In certain aspects, the leakage current following a two-hour burn test as conducted in the Examples below may be less than 2 A, less than 1 A, less than 500 mA, less than 300 mA, less than 100 mA, or less than 30 mA. Similarly, the mechanical strength of the splice following the burn test can be improved relative to conventional cable splices, as demonstrated by having relatively less or substantially no observable cracking formed in the ceramified layer of the splice.

Splice kits disclosed herein also may comprise an enclosure, and fittings for the enclosure to be connected with common conduit sizes. As for the connectors above, certain aspects can comprise multiple sizes and styles of conduit fittings to accommodate various needs in the field as they arise, such that the kit may be applied more universally. Enclosures similarly may be tailored in size depending on the application. For instance, kits can comprise an enclosure having an overall dimension of 4"×4"×12" with conduit fittings sized to receive a conduit having a diameter in a range from ½" to 1". Alternatively, kits can comprise an enclosure having an overall dimension of 6"×6"×12" with conduit fittings sized to receive a conduit having a diameter of 1¼". In still further aspects, kits can comprise an enclosure having an overall dimension of 6"×6"×16" with conduit fittings sized to receive a conduit having a diameter of 2". Additionally, splice kits can comprise a ceramifiable silicon rubber, for instance as a tape comprising the silicone rubber. Tape may be supplied with a pre-cut dimension appropriate for the splice, or as a roll to be cut and applied as needed.

Figure 2B:
FIG. 2B is a photograph of the spliced cable in FIG. 2A, with the ceramified silicone rubber layer removed to show the quartz underlayer.
Figure 2A:
FIG. 2A is a photograph of a spliced cable prepared as disclosed herein and subjected to a burn test according to the Examples.

FIG. 1 depicts an embodiment of a cable as may be applied within an enclosure as described herein. Cable splice 100 is shown applied to two portions of a conductor 104, which is provided within conduit 120 along with a second, unspliced and intact conductor 102 for reference. Conduit enters the enclosure 130 at opening 132 where a fitting (not shown) secures the conduit to the enclosure. Splice 110 is fixed to the cable 104 and comprises an outer tape layer comprising a ceramifiable silicone rubber wrapped around an inner quartz fabric (not shown), the quartz fabric surrounding the electrical connection within cable 104 (e.g., between a first and second conductor of cable 104). FIGS. 2A and 2B provide photographs of an example consistent with the embodiment shown in FIG. 1, after subjecting the spliced cable to a burn test and ceramifying the outer tape layer. As shown, the outer layer can be removed to reveal the intact and undamaged quartz layer remaining in position protecting the electrical connection.

Methods for forming a UL 2196-rated fire-resistant connection between two fire resistant cables are also contemplated herein, and can comprise (or consist essentially of, or consist of) inserting a first conductor and a second conductor into an enclosure, forming an electrical connection between the first and second conductors, surrounding the electrical connection with a quartz fabric, and applying a tape comprising a ceramifiable silicon rubber to the quartz fabric wherein the tape surrounds the electrical connection, and closing the enclosure.

Examples

Fire-resistant cables were spliced consistent with the methods and materials disclosed herein and subjected to testing in accordance with UL 2196 testing standards, and compliance with UL 2196.

In Examples 1A-1C, two sections of 18/2 wire, each comprising two 18-gauge conductors, were spliced together, and inserted via fitted conduit into a closed fiberglass splice box enclosure. The splice was formed by first securing a steel crimp butt connector to the exposed ends of the respective connectors to form electrical connection between conductors of the two sections of cable. The steel crimp connector was then surrounded axially by 25 g quartz veil which was secured to the conductors using with a silicon tape comprising Elastosil 512/70 R. During the test, a voltage of 72 V was applied to the splice, and leakage current through each spliced conductor (noted L1 and L2 in the table below) was monitored for two hours as the enclosure containing the splice was heated to 1850° F. This first example was repeated three times. As shown by the data in the table below, the splice maintained its mechanical and structural integrity and remained operational through each test run, having only minimal leakage current (~1 A) through each conductor at the end of each of the test runs.

In Example 2, the splice was prepared as described above for Example 1, and the quartz veil of the first was replaced by a comparable quantity and thickness of quartz felt. Again, as shown in the Table below, only minimal leakage current from either conductor was observed toward the end of the run (<1 A).

For each example, the spliced cable was removed from the enclosure following the test and examined according to its physical properties. As shown in FIG. 2A, the outer silicon layer of the splice had ceramified and remained in good mechanical condition following the test. The ceramified layer was pried off the splice to examine the condition of the underlayer and electrical connection. As shown in FIG. 2B, the quartz underlayer adjacent the metal connection remained intact showing only minor discoloration at the outer surface of the quartz layer. Thus, in each example, the tape layer of the splice effectively protected the mechanical and electrical operation of the cable following the 2 h test.

| | @ 30 min | | @ 1 h | | @ 90 min | | @ 2 h | |
|---|---|---|---|---|---|---|---|---|
| Example | Temp (° F.) | I (mA) | Temp (° F.) | I (mA) | Temp (° F.) | I (mA) | Temp (° F.) | I (mA) |
| 1A (L1) | 1206 | 0.7 | 1549 | 91 | 1776 | 285.4 | 1850 | 1163 |
| 1A (L2) | 1206 | 0.0 | 1549 | 80 | 1776 | 272.6 | 1850 | 1052 |
| 1B (L1) | 1218 | 0.1 | 1497 | 4.4 | 1775 | 225.3 | 1852 | 873 |
| 1B (L2) | 1218 | 0.1 | 1497 | 3.4 | 1775 | 209.1 | 1852 | 821 |
| 1C (L1) | 1489 | 1.5 | 1695 | 58.2 | 1776 | 385 | 1850 | 873 |
| 1C (L2) | 1489 | 0.8 | 1695 | 67.7 | 1776 | 377 | 1850 | 821 |
| 2 (L1) | 1098 | 0.6 | 1570 | 35.7 | 1776 | 237.1 | 1850 | 904 |
| 2 (L2) | 1098 | 0.0 | 1570 | 27.2 | 1776 | 226.7 | 1850 | 829 |

The invention claimed is:

1. A fire-resistant cable splice comprising:

a first cable comprising a first metal conductor;

a second cable comprising a second metal conductor;

a connector forming an electrical connection between the first and second metal conductors;

a quartz fabric consisting of quartz, wherein the quartz fabric is in contact with and surrounding the connector; and an insulation layer in contact with and surrounding the quartz fabric, wherein the insulation layer comprises a ceramifiable silicon rubber;

wherein the fire-resistant cable splice remains operational up to temperatures of at least 1850° F.

2. The splice of claim 1, wherein the quartz fabric is a quartz wool, a quartz yarn, a quartz roving, a chopped quartz, a quartz veil, or a quartz felt.

3. The splice of claim 1, wherein the quartz fabric is a quartz felt or quartz wool.

4. The splice of claim 1, wherein the quartz fabric has a compressed thickness in a range from 0.1 mm to 2 mm.

5. The splice of claim 1, wherein the insulation layer has a thickness in a range from 0.1 mm to 2 mm.

6. The splice of claim 1, wherein the splice does not comprise a jacket layer surrounding the insulation layer.

7. The splice of claim 1, wherein either or both of the first and second cables is an insulated cable selected from a THHN cable, a THWN cable, a THWN-2 cable, a XHHW cable, or a XHHW-2 cable.

8. The splice of claim 1, further comprising an enclosure surrounding the connection between the first and second metal conductors.

9. The splice of claim 8, wherein the enclosure is a NEMA-1 enclosure.

10. The splice of claim 8, wherein the enclosure has a fiberglass construction.

11. The splice of claim 8, wherein the enclosure comprises a conduit fitting configured to receive a conduit surrounding either of the first and second cables.

12. The splice of claim 11, wherein either or both of the first or second cables enters the enclosure from a conduit disposed within a conduit.

13. The splice of claim 12, wherein the conduit is an electrical metallic tubing.

14. A fire resistant cable splice kit comprising:

a connector configured to secure a first metal conductor to a second metal conductor;

a quartz fabric consisting of quartz fibers;

a tape comprising a ceramifiable silicon rubber; and an enclosure.

15. The kit of claim 14, wherein the connector is a steel crimp sleeve connector or a steel crimp butt connector.

16. The kit of claim 15, wherein:

the enclosure comprises conduit fittings sized to receive a conduit with a conduit diameter in a range from ½" to 1" and an overall dimension of 4"×4"×12";

the enclosure comprises conduit fittings sized to receive a conduit with a conduit diameter of 1¼" and an overall dimension of 6"×6"×12"; or the enclosure comprises conduit fittings sized to receive a conduit with a conduit diameter of 2" and an overall dimension of 6"×6"×16".

17. The kit of claim 14, wherein the quartz fabric is a quartz felt or quartz wool.

18. The kit of claim 14, wherein the ceramifiable silicon rubber is Elastosil® R 512/70.

19. A method for forming a fire-resistant connection between two fire resistant cables, the method comprising:

inserting a first conductor and a second conductor into an enclosure;

forming an electrical connection between the first and second conductors;

surrounding the electrical connection with a quartz fabric consisting of quartz fibers; and applying a tape comprising a ceramifiable silicon rubber to the quartz fabric; wherein the tape surrounds the electrical connection; and closing the enclosure.

20. The method of claim 19, wherein applying the tape comprises forming an overlapping helical layer of the tape extending axially from a first conductor insulation and across the electrical connection to a second conductor insulation.

* * * * *